(12) United States Patent
Krieger et al.

(10) Patent No.: US 6,799,993 B2
(45) Date of Patent: Oct. 5, 2004

(54) PORTABLE ELECTRICAL ENERGY SOURCE

(75) Inventors: Michael Krieger, Miami Beach, FL (US); Bruce Randolph, Ft. Lauderdale, FL (US)

(73) Assignee: Vector Products, Inc., Ft. Lauderdale, FL (US)

( * ) Notice: Subject to any disclaimer, the term of this patent is extended or adjusted under 35 U.S.C. 154(b) by 111 days.

(21) Appl. No.: 10/325,108

(22) Filed: Dec. 20, 2002

(65) Prior Publication Data

US 2004/0121225 A1 Jun. 24, 2004

(51) Int. Cl.[7] .............................................. H01R 3/00
(52) U.S. Cl. .................................................... 439/500
(58) Field of Search ................................ 439/500, 501, 439/504; 320/105, 112

(56) References Cited

U.S. PATENT DOCUMENTS

| | | | |
|---|---|---|---|
| 762,684 A | 6/1904 | Case ........................... 439/513 |
| 2,610,987 A | 9/1952 | Betz ............................. 429/96 |
| 2,626,972 A | 1/1953 | Marquardt ............... 280/47.17 |
| 2,659,042 A | 11/1953 | Anderson et al. ........... 320/105 |
| 2,718,540 A | 9/1955 | Betz ............................. 429/96 |
| 2,991,376 A | 7/1961 | Sherwood et al. .......... 307/156 |
| 4,037,720 A | 7/1977 | McGurk ...................... 206/702 |
| 4,161,682 A | 7/1979 | Corvette ..................... 320/105 |
| 4,215,306 A | 7/1980 | Mace .......................... 320/105 |
| 4,258,305 A | 3/1981 | Anglin ........................ 320/105 |
| 4,300,087 A | 11/1981 | Meisner ...................... 320/112 |
| 4,355,275 A | 10/1982 | Anglin |
| 4,443,751 A | 4/1984 | Humphrey .................. 320/105 |
| 4,444,853 A | 4/1984 | Halsall et al. ................. 429/54 |
| 4,489,223 A | 12/1984 | Puckett et al. ......... 191/12.2 R |
| 4,564,797 A | 1/1986 | Binkley ...................... 320/105 |
| 4,653,833 A | 3/1987 | Czubernat et al. .......... 439/528 |
| 4,667,141 A | 5/1987 | Steele ......................... 320/105 |
| 4,692,680 A | 9/1987 | Sherer ........................ 320/103 |
| 4,885,524 A | 12/1989 | Wilburn ..................... 320/105 |
| 4,942,964 A | 7/1990 | Hsu ............................ 206/702 |
| D310,204 S | 8/1990 | Roberts, Jr. ................ D13/109 |
| D310,207 S | 8/1990 | Sheps ........................ D13/119 |
| 4,983,473 A | 1/1991 | Smith ........................... 429/48 |
| 5,039,930 A | 8/1991 | Collier et al. |
| 5,077,513 A | 12/1991 | Dea et al. |
| D329,636 S | 9/1992 | Nesiba |
| 5,166,478 A | 11/1992 | Sprouse |
| 5,167,529 A | 12/1992 | Verge ......................... 439/504 |
| 5,183,407 A | 2/1993 | Srol .......................... 439/1.35 |
| 5,214,368 A | 5/1993 | Wells |
| 5,367,243 A | 11/1994 | Wells et al. |
| 5,389,462 A | 2/1995 | Lin |
| D366,026 S | 1/1996 | Morse et al. |
| D374,859 S | 10/1996 | Guay et al. |
| 5,982,138 A | 11/1999 | Krieger ...................... 320/105 |
| D429,482 S | 8/2000 | Hussaini et al. |
| RE37,482 E | 12/2001 | Guay et al. |
| 6,636,015 B1 * | 10/2003 | Levine et al. ............... 320/105 |

FOREIGN PATENT DOCUMENTS

| | | |
|---|---|---|
| GB | 2028022 | 2/1980 |
| JP | 5-328620 | 10/1993 |
| WO | WO 94/28609 | 12/1994 |

* cited by examiner

*Primary Examiner*—Tulsidas C Patel
(74) *Attorney, Agent, or Firm*—Venable LLP; Robert Kinberg; Ralph Albrecht

(57) ABSTRACT

A portable energy source includes a case defining a battery compartment having an opening, a cover that covers the opening of the battery compartment, a power inverter mechanically coupled to the cover and adapted to be electrically coupled to the battery by leads disposed on the case when the cover is disposed to cover the opening of the compartment.

23 Claims, 2 Drawing Sheets

PORTABLE ELECTRICAL ENERGY SOURCE

BACKGROUND OF THE INVENTION

1. Field of the Invention

The present invention relates generally to electrical energy sources and more particularly to portable electrical energy sources.

2. Related Art

Conventional portable electrical energy sources can be used for providing direct current for such purposes as jump-starting an automobile, boat or other vehicle as well as for providing direct current for energizing various appliances. For example, a variety of jump-start systems are manufactured and distributed by Vector Products, Inc., of Fort Lauderdale, Fla., U.S.A. under trade name PRO-CHARGE. For example, the PRO-CHARGE-900 jump-start system provides a 12-volt, 400 ampere power supply. In the example jump-start system, a heavy-duty 12-volt battery is arranged inside an impact-resistant polyethylene case. Heavy duty No. 4 industrial booster cables attached to the battery extend through the case and are attached to heavy duty 400 amp booster clamps which, when not in use, can rest on shoulders molded on the case. Direct current (DC) appliances may be plugged into a DC outlet socket mounted in the casing and coupled to the battery. The jump-start battery can be charged by a car battery via a DC/DC power cord provided with a male plug adapted to be inserted into the cigarette lighter of an automobile. The jump-start battery may also be charged via an appropriate alternating current (AC) adapter/charger.

Conventional power inverters convert DC into AC. For example, Vector Products, Inc., of Fort Lauderdale, Fla., U.S.A. also manufactures and distributes a self-contained power inverter under the trade name POWER FORCE 140. The example power inverter plugs directly into a cigarette lighter socket or other 12-volt power source for converting 12-volt DC energy to 110-volt AC.

The PRO-CHARGE-900 jump-start system also includes a cigarette lighter socket so that a power inverter such as the POWER FORCE 140 may be,plugged into the jump-start system. In such a configuration, the jump-start system can provide either 12-volt DC or 110-volt AC. One conventional jump-start system includes a power inverter within an impact resistant casing along with a 12-volt battery to provide a portable jump-start system which provides both a 12-volt DC power supply and a 110-volt AC supply.

Thus, conventional portable jump-start systems unfortunately often require tools such as wrenches to be used to access battery compartments for accessing and replacing a 12-volt battery. Further, tools were also required conventionally to couple a battery to a power inverter. While the integration of a power inverter along with a 12-volt battery provides both AC and DC electrical energy, conventional systems do not provide an easy method for a consumer to access the 12-volt battery for replacement.

SUMMARY OF THE INVENTION

An exemplary embodiment of the present invention is directed to a portable energy source including a portable case defining a battery compartment cavity having an opening; a cover adapted to cover the opening of the battery compartment; a power inverter mechanically coupled to the cover; and one or more leads disposed on the case, the leads being adapted to electrically couple the inverter to a battery when the cover is closed over the opening of the battery compartment.

In one exemplary embodiment, each of said plurality of leads includes a bolt and a thumbscrew.

In another exemplary embodiment of the present invention, the portable energy source further includes an air compressor electrically coupled to the leads and mechanically coupled to the case.

In yet another exemplary embodiment, the portable energy source further includes a 12-volt direct current battery electrically coupled to the leads and removably positioned in the battery compartment.

In one exemplary embodiment, the portable energy source further includes a pair of jumper cables, each individual jumper cable of the pair of jumper cables being electrically coupled to one of the leads.

In another exemplary embodiment, the portable energy source further includes a lamp electrically coupled to the leads.

In yet another exemplary embodiment, the portable energy source further includes a wheel.

In yet another exemplary embodiment, the portable energy source further includes a handle. In one exemplary embodiment, the handle is extendible and retractable.

In another exemplary embodiment, the portable energy source further includes an outlet electrically coupled to the leads.

In another exemplary embodiment, the portable energy source further includes a recess that can receive an AC powered DC battery charger having cables appropriate for coupling to a 12-volt vehicle battery. In an exemplary embodiment, the batter charger can be plugged into an outlet.

In an exemplary embodiment, a portable energy source sets forth a portable case having an outer surface and defining an interior cavity having an opening adapted to receive a direct current battery; a cover adapted to be disposed over the opening of the interior cavity; a power inverter adapted to convert direct current into alternating current mechanically coupled to the cover; a direct current lead supported on the case and electrically coupled to the battery adapted to supply direct current from the battery to the lead; and an attachment mechanism adapted to removably mechanically couple the cover to the portable case over the opening of the interior cavity and to electrically couple the inverter to the lead when the cover is made to cover the opening of the interior cavity.

In another exemplary embodiment, the portable energy source further includes a 12-volt DC battery and further includes a pair of booster cables coupled to the lead for extending outside the case for jump-starting a weak battery of a vehicle.

In yet another exemplary embodiment, the attachment mechanism includes a bolt and a thumbscrew.

In another exemplary embodiment, the portable energy source further includes an air compressor coupled to the battery that can be used to inflate a vehicle tire.

In yet another exemplary embodiment, the portable energy source further includes an outlet coupled to the lead adapted to provide DC current to electrically powered devices.

In yet another exemplary embodiment, the portable energy source further includes a lamp coupled to the lead.

In one exemplary embodiment, the portable energy source further includes an. AC to DC battery charger coupled to the battery.

In yet another exemplary embodiment, the portable energy source can further include an extendible and retractable handle; and a wheel.

In one exemplary embodiment, the case can include a cap having: an outlet; a recess for receiving a lamp; and an indicator panel. In one exemplary embodiment, the indicator can provide an indication of battery charge strength. In another exemplary embodiment, the indicator can provide an indication of active devices.

In another exemplary embodiment, the case can be adapted to receive externally, a removably, mechanically coupled air compressor.

In another exemplary embodiment, the portable energy source can further include two battery cables coupled to the battery, each of the two battery cables having an end coupled to a respective battery clamp; and a holder having two pairs of grips, each of the two pairs of grips being adapted to grasp a respective battery clamp.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left-most digit of a reference numeral corresponds to the figure number of the first figure depicting the referenced feature.

DETAILED DESCRIPTION OF THE INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of :the invention.

Figure 1:
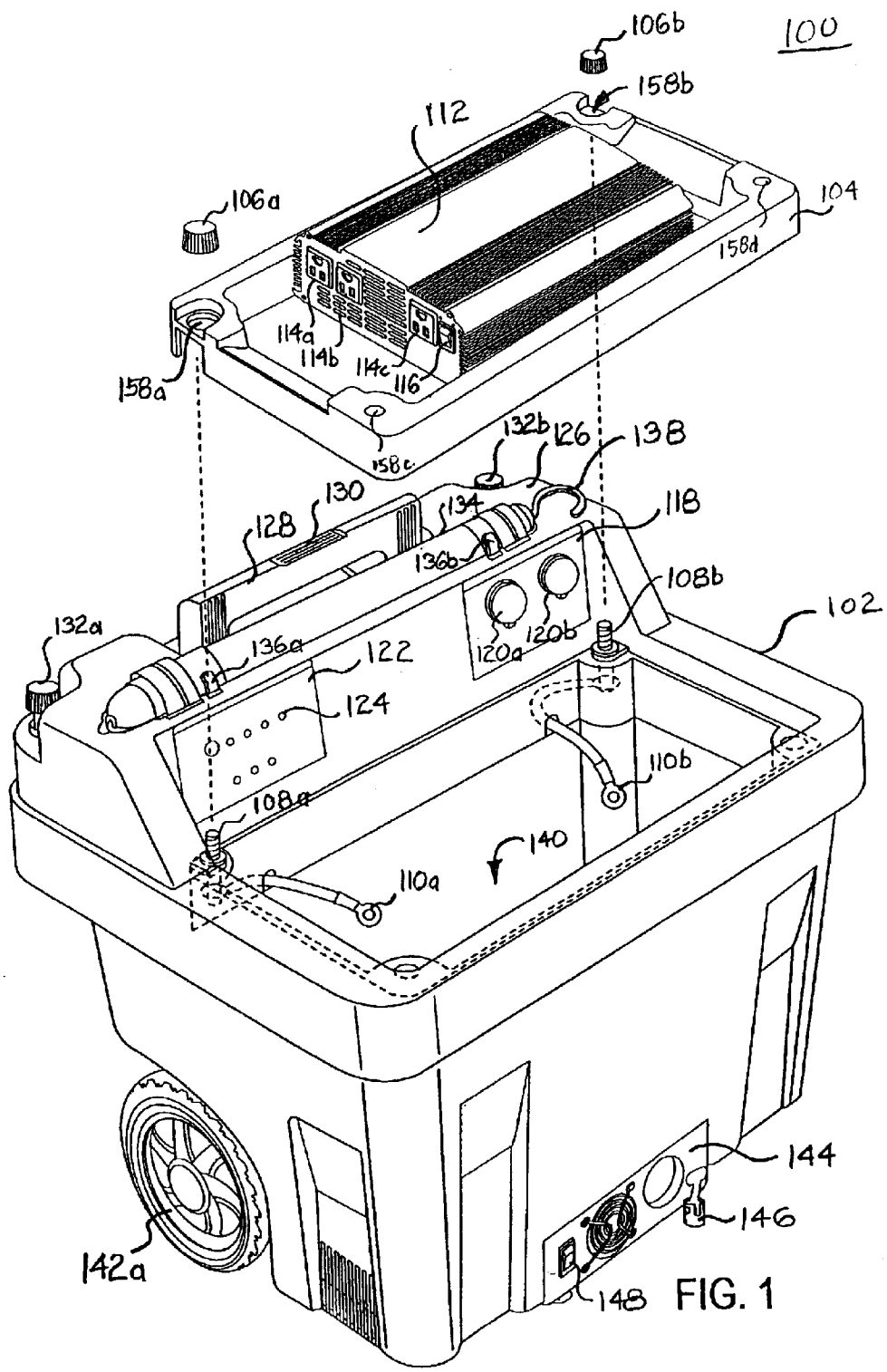
FIG. 1 depicts an isometric view of an exemplary embodiment of a portable electrical energy source according to the present invention.

FIG. 1 depicts an isometric view of an exemplary embodiment of portable energy source system 100 according to the present invention. Portable energy source system 100, in an exemplary embodiment, includes an impact resistant polyethylene case 102 defining a cavity or battery compartment 140 for receiving a 12-volt DC battery (not shown). Portable energy source system 100 can further include, in an exemplary embodiment, a polyethylene cover 104 that is adapted to cover an opening of the battery compartment 140. Cover 104 can be adapted to be mechanically secured via thumbscrews 106a, 106b to case 102 at bolts 108a, 108b. Bolts 108a, 108b can be electrically coupled to leads 110a, 110b for attachment to the 12-volt DC battery by any of various well known connectors available to electrically couple a cable to a battery. In an exemplary embodiment, a power inverter 112 can be mechanically coupled to the cover 104 and can be further electrically coupled via leads and cables (not shown) extending on the underside of cover 104 from the power inverter 112 to holes 158a, 158b. When the combination of the power inverter 112 and cover 104 is placed over the opening of the battery compartment 140 of case 102, the holes 158a, 158b are placed over bolts 108a, 108b, respectively. Thumbscrews 106a, 106b are used to secure the cover 104 to case 102 at bolts 108a, 108b, respectively. In an: exemplary embodiment, holes 158a, 158b of cover 104 can be used to align the cover 104 over the opening of the battery compartment 140, allowing the bolts 108a, 108b to pass vertically through the horizontal cover 104 to be coupled to thumbscrews 106a, 106b. The thumbscrews 106a, 106b in turn electrically couple bolts 108a, 108b to the leads (not shown) that are coupled to terminals of the power inverter 112.

33 In an exemplary embodiment, power inverter 112 can include one or more AC power outlets 114a, 114b and 114c. The power inverter 112, as shown, can also include toggle switch 116 for energizing the:power inverter 112.

In an exemplary embodiment of the present invention, case 102 can further include a cap 126 secured in the exemplary embodiment by thumbscrews 132a, 132b to bolts 210a, 210b (not shown in FIG. 1), respectively. In the exemplary embodiment depicted in FIG. 1, cap 126 can include one or more outlets 120a, 120b. Outlets 120a, 120b can include any of various well known AC or DC power outlets including, e.g., a 110-volt AC outlet or a 12-volt DC outlet. Indicators 124 can be provided via panel 122 of cap 126 in an exemplary embodiment. Indicators 124 can include any of various power indicators as would be apparent to those skilled in the art, such as, e.g., charge level of the battery, active devices, a reverse polarity alarm, a battery status selector button, a "turn on normally" indicator, and other indicators that would be useful to a person having ordinary skill in the art. In an exemplary embodiment of the invention, cap 126 can further include clamps 136a, 136b that can be used to securely receive a lamp 134 that can in an exemplary embodiment be electrically energized by, or if equipped with a rechargeable energy source charged by portable energy source system 100 via electrical coupling (not shown). In an exemplary embodiment, lamp 134 can be received into a recessed cavity that can be formed in cap 126. In one exemplary embodiment, the lamp 134 can further include a hook 138 for conveniently hanging the lamp 134. As shown, in an exemplary embodiment, lamp 134 can include a cylindrical fluorescent light bulb. Of course, any other suitable type of light source including, e.g., an incandescent light source could be used instead without departing from the present invention. It will be apparent to those skilled in the art that any of the features placed in or on cap 126 could be instead provided elsewhere on case 102 within the scope of the present invention.

Portable energy source system 100 can further include, in an exemplary embodiment, a handle 128 that can be extended or retracted by depressing button 130 similarly to the use of well-known retractable handles on conventional portable luggage. When the handle 128 is extended, the portable energy source system 100 can be rolled via wheels 142a, 142b (not shown) when portable energy source system 100 is rotated about an axle mechanically coupling wheels 142a, 142b to the system.

Figure 2:
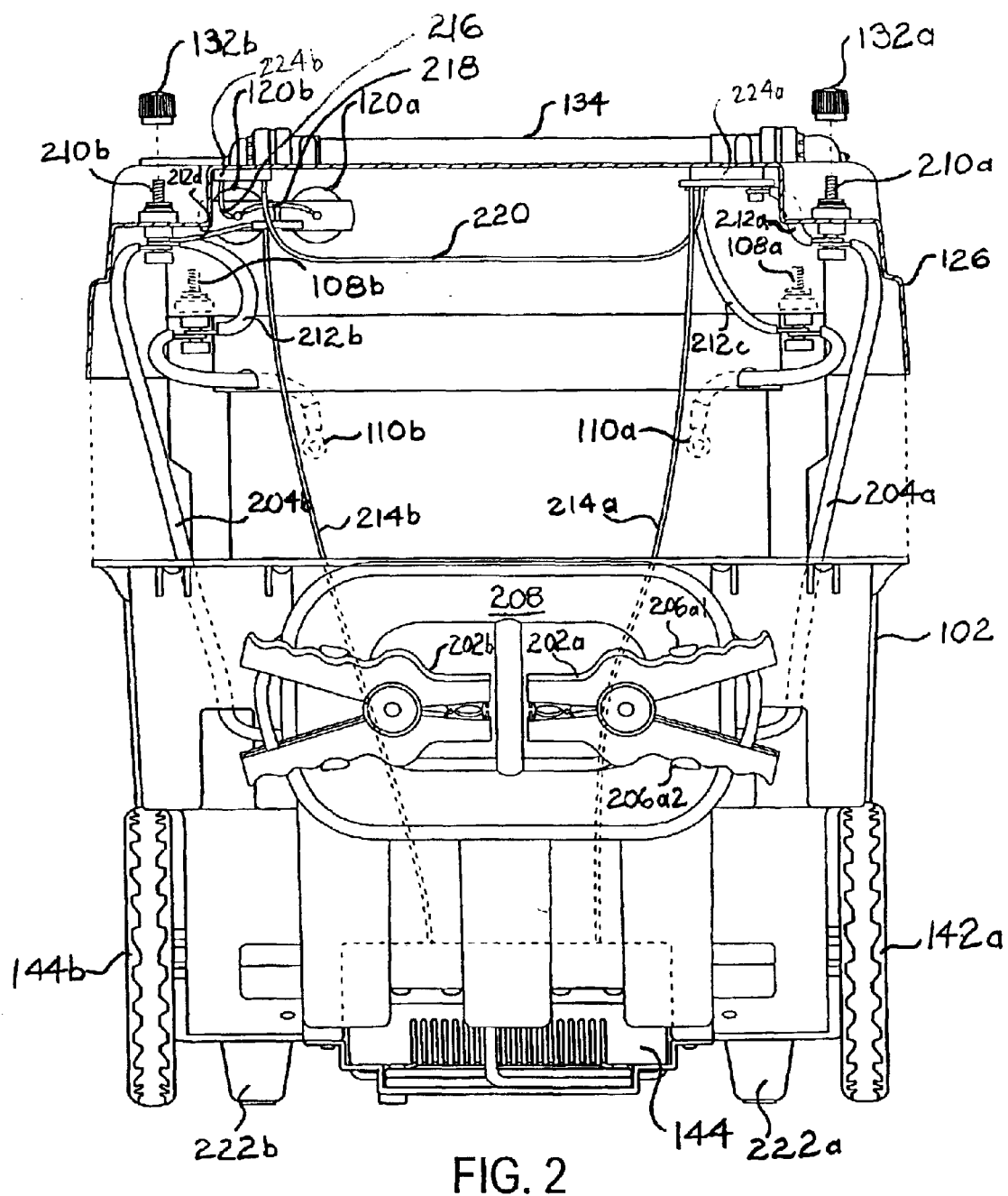
FIG. 2 illustrates a rear view of the exemplary embodiment of the portable electrical energy source according to the present invention.

In an exemplary embodiment of portable energy source system 100, case 102 can be further adapted to mechanically couple an air compressor 144 to the exterior of case 102 (as shown, e.g., in FIG. 2). The case 102 can be electrically coupled to the 12-volt battery. Air compressor 144 can include a connector 146 for coupling the air compressor to a tire, for example. The air compressor 144 can be electrically energized via toggle switch 148 in an exemplary embodiment.

Although not shown, in an exemplary embodiment, the portable energy source system 100 can further include a heavy-duty 12-volt power supply battery having positive and negative poles that can be coupled to leads 110a, 110b, respectively.

FIG. 2 depicts a rear view 200 of portable energy source system 100 providing further details of an exemplary embodiment of the present invention. Rear view 200 depicts an exemplary embodiment of portable energy source system 100, including positive and negative booster clamps 202a and 202b mechanically secured to holder 208 which is in turn mechanically coupled to case 102. Specifically, in an exemplary embodiment, booster clamp 202a can be secured to the holder 208 by grips 206a1 and 206a2 as shown. Booster clamps 202a, 202b can be electrically coupled to the 12-volt battery via, e.g., respective jumper cables 2.04a, 204b which can extend through case 102. In the exemplary embodiment, jumper cables 204a, 204b can be electrically coupled to leads 210a, 210b, respectively as shown. Lead 210a, in an exemplary embodiment can be electrically coupled to lead 108a via, e.g., cables 212a and 212c, which, as shown can be electrically coupled to one another via conductor 224a. In an exemplary embodiment, lead 210b, can be electrically coupled to lead 108b via, cable 212b. As shown, in an exemplary embodiment, lead 210b can be further electrically coupled via cable 212d to first conductors of outlets 120a, 120b, and also to a first power cable of air compressor 144 if a DC powered compressor is used. Second conductors of outlets 120a, 120b can be electrically coupled to conductor 224b via cable 216 and to one another via cable 218, as shown in the exemplary embodiment. Conductor 224b, in an exemplary embodiment, can be electrically coupled to conductor 224a via cable 220 to complete a DC circuit. Conductor 224a, in an exemplary embodiment, can be electrically coupled via cable 214a to a second power cable of air compressor 144.

As will be apparent to those skilled in the art, lamp 134 can be electrically coupled to the battery of portable energy source system 100 via other circuitry, wiring, or cables (not shown) and conductors 224a, 224b.

Indicators 124 (not shown in FIG. 2) with or without well known additional circuitry can be further electrically coupled via cables or conductors (not shown) to the portable energy source system 100.

Portable energy source system 100, in an exemplary embodiment, can further include an AC powered battery charger (not shown), for charging the 12-volt DC battery, or an external vehicle battery, for example. The battery charger can be plugged into a standard AC receptacle outlet (not shown) to energize the charger. The battery charger can be fashioned to include a pair of booster clamps, each coupled to a cable for electrically coupling the battery charger to the battery to be charged. In an exemplary embodiment, an additional covered recess or cavity in case 102 (not shown) can be provided in which to store the battery charger when not in use. In one embodiment, a hinged door can rotate about an access to provide access to the recess or cavity.

As shown, in FIG. 2, portable energy source system 100 can further include feet 222a and 222b for supporting case 102 when in a stationary position. Feet 222a, 222b, in an exemplary embodiment, can be used to insulate the base of case 102 from contact with the ground. Further, in an exemplary embodiment, feet 222a, 222b can protect air compressor 144 from bearing the weight of the portable energy source system 100 when disposed in contact with the outer surface of the base of case 102 as shown in the exemplary embodiment. Feet 222a, 222b also serve to maintain in a balanced, level, horizontal position, the portable energy source system 100, when the system 100 is not being pulled via handle 128 (not shown in FIG. 2).

Referring back to FIG. 1, cover 104 according to an exemplary embodiment, can advantageously allow coupling of the power inverter 112 via thumbscrews 106a, 106b to the portable energy source system 100 both electrically and mechanically. Once cover 104 has been placed atop the opening of the battery compartment 140 of case 102, the power inverter 112 can be secured in place by tightening the thumbscrews 106a, 106b. Advantageously, cover 104 can serve to cover battery compartment 140 so as to protect the 12-volt battery from the external environment. The cover 104 of portable energy source system 100 can further optionally include additional holes 158c, 158d that in an exemplary embodiment can be used to further mechanically align, and secure cover 104 to the case 102 of portable energy source system 100 via, e.g., additional bolts and thumbscrews (not shown).

Further, other forms of connection for mechanically and/or electrically coupling the cover 104 and power inverter 112 to the battery compartment 140 and battery of the present invention, other than a bolt and thumbscrew, can be provided within the scope of the invention as discussed further below.

The case 102 and cover 104, in an exemplary embodiment, may be formed out of a plastic injection molded product and can include various other indentations, vents, recesses, or cavities, such as, e.g., those shown, but not discussed, for example. Although the cover 104 as depicted in the exemplary embodiment is of a generally rectangular shape to cover the top of a vehicle battery-shaped compartment cavity, a cover 104 of any other shape could similarly be used within the scope of the present invention.

As will be apparent to those skilled in the relevant arts of attachment and fastening, power inverter 112 can be mechanically coupled to cover 104 using any of various other well known methods or apparatuses commonly used for attachment. Exemplary methods and apparatuses of attachment include, e.g., connecting via screws, rivets or other connectors such as, e.g., adhesives, hinges, springs, spring biased grips, snaps, clamps, zippers, VELCRO connections, other conductors, and/or other connectors which would be apparent .to those skilled in the art, or even by encasing the inverter within the cover 104. In one exemplary embodiment (not shown) the cover 104 can be shaped and adapted to removably hold the power inverter 112. The power inverter 112 can be electrically coupled to bolts 108a, 108b via electrical leads (not shown). The electrical leads can encircle holes 158a, 158b and can be made to safely make electrical contact with bolts 108a, 108b when the cover 104 is placed over battery compartment 140, when thumbscrews 106a, 106b are securely placed on bolts 108a, 108b.

Although cap 126 is coupled to case 102 via thumbscrews 132a, 132b and bolts 210a, 210b, as shown in the exemplary embodiment, it will be apparent to those skilled in the art that any other well known method of attachment could be used to couple the cap 126 to case 102. For example, cap 126 could be secured to case 102 by screws or rivets (not shown) spaced around an edge of cap 126. Other mechanisms for attaching cap 126 to the outer surface of case 102 could also be used as will be apparent to those skilled in the art, including, e.g., an adhesive or VELCRO fastener.

As will be apparent to those skilled in the art, the principles of the present invention may be implemented in connection with any portable DC power supply but are particularly useful in connection with a portable jump-start system for jump-starting cars, trucks, boats and other vehicles. A variety of jump-start systems are commercially available which can be retrofitted with a cover 104 of the type described above. One such system is the above-mentioned PRO-CHARGE-900 manufactured and distributed by vector Products, Inc., of Fort Lauderdale, Fla., U.S.A.

A variety of commercially available power inverters 112 are known, which can be utilized in implementing the invention, such as, e.g., the POWER FORCE-140, also manufactured and distributed by Vector Products, Inc., of Fort Lauderdale, Fla., U.S.A. Likewise, any other type of power inverter 112 conventionally available, can be used with the present invention.

Any type of air compressor 144 conventionally available may be used in accordance with the present invention. In one embodiment, the air compressor 144 is shown placed adjacent the bottom exterior surface of case 102. Any other position atop, aside or on the bottom of case 102 could be equally used. In the illustrated embodiment, the air compressor 144 is provided in a form that can be slidably received and removably positioned on the exterior surface on an exterior surface of the case 102 through which cables 214a and 214b can be used to electrically couple the air compressor 144 to the energy source system 100. However, other mechanisms for removably positioning, or attaching the air compressor 144, or permanently mechanically attaching the air compressor 144 to the exterior of case 102 in accordance with an exemplary embodiment of the present invention. For example, air compressor 144 or case 102 could be provided with a lip for securing the air compressor 144 to the case 102. The air compressor 102 could be provided a frictional indentation or recess in the case 102 into which to receive and secure the air compressor 144 in a frictional fit using something such as, e.g., a VELCRO connection or other attachment. Another possibility could include providing a snap connection between the air compressor 144 and the exterior surface of case 102. Any other mechanism for removably securing, or permanently securing the air compressor to the outer surface of case 102 is conceivable within the spirit and scope of the invention and will be apparent to those skilled in the art. Likewise, the same can be said for methods of mechanically securing the power inverter 112 to cover 104.

Portable energy source system 100 is manually transportable. Energy source system 100 can include a handle 128 and wheels 142a, 142b as already noted for ease of portability from place to place. However, as will be apparent to those skilled in the art, alternative exemplary embodiments can be provided according to the present invention that may not include a handle or wheels, or may include any of a number of other well known handles, grips, wheels, coasters, bearings, or other means of transportation.

The cover 104 can be used to cover other cavities according to another exemplary embodiment of the present invention. For example, the cover 104 could be placed over a battery compartment in a vehicle. The cover could be integrated as part of a handheld transportable energy source, in one embodiment. In another exemplary embodiment of the present invention, the cover 104 can enable easy access to a cavity for storing items while at the same time providing electrical coupling of electrically-powered devices mechanically coupled to the cover 104.

The invention allows easily transporting power inverter 112, together with the DC battery supply/battery, to provide a combined AC/DC power source. The invention can further provide a battery charger and/or an air compressor. When desirable, the power inverter 112 can be easily removed from the battery compartment 140 without the aid of tools to allow replacing or charging the battery. Outlets and indicators are provided for easy of access to power and status information.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A portable energy source comprising:
    a case defining a battery compartment adapted to receive a battery and having an opening;
    a cover to cover the opening of said battery compartment;
    a power inverter adapted to convert direct current (DC) to alternating current (AC), mechanically coupled to said cover; and
    a plurality of leads disposed on said case, said plurality of leads being adapted to electrically couple said power inverter to the battery when said cover is closed over said opening of said battery compartment.

2. The portable energy source according to claim 1, wherein each of said plurality of leads comprises:
    a bolt; and
    a thumbscrew.

3. The portable energy source according to claim 1, further comprising:
    an air compressor electrically coupled to said leads and mechanically coupled to said case.

4. The portable energy source according to claim 1, further comprising:
    a 12-volt direct current battery electrically coupled to said plurality of leads and removably positioned in said battery compartment.

5. The portable energy source according to claim 1, further comprising:
    a pair of jumper cables, each individual jumper cable of said pair of jumper cables being electrically coupled to one of said plurality of leads.

6. The portable energy source according to claim 1, further comprising:
    a lamp electrically coupled to said plurality of leads.

7. The portable energy source according to claim 1, further comprising:
    a wheel coupled to said case.

8. The portable energy source according to claim 1, further comprising:
    a handle coupled to said case.

9. The portable energy source according to claim 8, wherein said handle is extendible and retractable.

10. The portable energy source according to claim 1, further comprising:
an outlet electrically coupled to said plurality of leads.

11. The portable energy source according to claim 1, further comprising:
an AC powered battery charger supported by said case and having a pair of booster clamps and cables for charging the battery.

12. A portable electrical energy source, comprising:
a portable case having an outer surface and defining an interior cavity;
a direct current (DC) battery disposed in said interior cavity;
a cover adapted to be disposed over an opening of said interior cavity;
a power inverter adapted to convert DC into alternating current (AC) disposed on said cover;
a lead supported on said case and electrically coupled to the battery; and
an attachment adapted to removably attach said cover over said opening of said interior cavity and to electrically couple said power inverter to said lead to supply DC current from the battery to said power inverter, when said cover is disposed over said opening.

13. The portable electrical energy source according to claim 12, wherein the battery comprises a 12-volt DC battery and further comprising:
a pair of booster cables coupled to the battery for extending outside the case for jump-starting a weak battery of a vehicle.

14. The portable electrical energy source according to claim 12, wherein said attachment comprises a bolt and a thumbscrew.

15. The portable electrical energy source according to claim 12, further comprising an air compressor coupled to the battery.

16. The portable electrical energy source according to claim 12, further comprising an outlet coupled to the battery adapted to provide DC current.

17. The portable electrical energy source according to claim 12, further comprising a lamp coupled to the battery.

18. The portable electrical energy source according to claim 12, further comprising an AC to DC battery charger coupled to the battery.

19. The portable electrical energy source according to claim 12, further comprising at least one of:
a handle;
an extendible and retractable handle;
one or more feet; and
one or more wheels.

20. The portable electrical energy source according to claim 12, wherein said case comprises a cap comprising at least one of:
an outlet;
a recess for receiving a lamp; and
an indicator panel.

21. The portable electrical energy source according to claim 12, wherein said case comprises an exterior surface adapted for receiving a removably positioned air compressor.

22. The portable electrical energy source according to claim 21, wherein said air compressor is removably positioned adjacent to said exterior surface at the bottom of said case.

23. The portable electrical energy source according to claim 21, and further comprising:
two battery cables coupled to the battery, each of said two battery cables having an end coupled to a respective battery clamp; and
a holder having two pairs of grips, each of said two pairs of grips adapted to grasp one of said two battery clamps.

* * * * *